United States Patent [19]

Chalmers et al.

[11] Patent Number: 4,890,174
[45] Date of Patent: Dec. 26, 1989

[54] ROTARY VOICE COIL MICRO-HARD DISK DRIVE SYSTEM

[75] Inventors: Brian D. Chalmers; Colin A. Mackenzie; Kishore K. Kapoor, all of Fife, Scotland

[73] Assignee: Rodime PLC, United Kingdom

[21] Appl. No.: 29,056

[22] Filed: Mar. 18, 1987

Related U.S. Application Data

[63] Continuation of Ser. No. 854,949, Apr. 23, 1986, abandoned.

[51] Int. Cl.$^4$ .......................... G11B 5/55; G11B 21/08
[52] U.S. Cl. .............................. 360/78.12; 360/77.05; 360/98.07
[58] Field of Search .................. 360/77, 78, 97–99, 360/105–107, 109, 77.02, 77.03, 77.04, 77.05, 77.06, 77.07, 77.08, 77.11, 77.12, 77.01, 78.01, 78.04, 78.05, 78.06, 78.07, 78.08, 78.09, 78.11, 78.12, 78.13, 78.14, 97.01, 97.03, 97.04, 98.01, 98.02, 98.07, 99.01, 99.04, 99.08, 99.11

[56] References Cited

U.S. PATENT DOCUMENTS

| | | | |
|---|---|---|---|
| 3,849,800 | 11/1974 | Cuzner et al. | 360/97 |
| 4,535,372 | 8/1985 | Yeakley | 360/77.05 |
| 4,638,383 | 1/1987 | McGinby et al. | 360/77 |
| 4,639,863 | 1/1987 | Harrison et al. | 360/97 |
| 4,669,004 | 5/1987 | Moon et al. | 360/77 |
| 4,689,703 | 8/1987 | Olbrich et al. | 360/97 |
| 4,712,146 | 12/1987 | Moon et al. | 360/97 |
| 4,714,972 | 12/1987 | Biermeier et al. | 360/97 |

FOREIGN PATENT DOCUMENTS

| | | |
|---|---|---|
| 0151256 | 8/1985 | European Pat. Off. |
| 1342495 | 1/1974 | United Kingdom . |
| 2073501 | 10/1981 | United Kingdom . |
| 2127610 | 9/1982 | United Kingdom . |
| 2100050 | 12/1982 | United Kingdom . |

OTHER PUBLICATIONS

Electronic Engineering Times "Winchester Disk Drives" Clements, 2/25/85, Issue 318 pp. 53,56,58,59,60,62,63,65.
Hewlett Packard brochure for HP97501A, "3½" 10 mbyte micro-Winchester Disc Drive", 11/1/84.
IEEE Trans on Magnetics vol. mag. 17, No. 4, "Mechanical and Servo Design of a 10 inch Disk Drive" Mizoshita et al., 7/81, pp. 1387–1391.
Electronics International, vol. 56, No. 5, 3/10/83 pp. 139–142.
Plus, "Hardcard-the easy-to-use 10 Megabyte Hard Disk Drive On A Plug-in Card", 1985.

Primary Examiner—Alan Faber
Assistant Examiner—Steven R. Garland
Attorney, Agent, or Firm—Mason, Fenwick & Lawrence

[57] ABSTRACT

A very high capacity, closed-loop Winchester disk drive system particularly suited to meet the demands of a portable computer system is disclosed. The micro-Winchester disk is a Winchester disk of 95 mm in diameter. The disk drive system of the present invention, by virtue of its small size and vibration isolation, is ideally suited for use in portable computer systems. The micro-Winchester disk drive system was developed to store data at a density in excess of 1000 tracks per inch utilizing a closed-loop rotary voice coil positioning mechanism. This disk drive system provides fast access data storage for use with small business computers, terminals and microprocessor-based systems, portable or otherwise, and many other areas where compact, rugged, and lightweight hard disk storage is required. The disk drive system of the present invention normally utilizes between two and four hard disks, such as Winchester disks, with one disk containing a dedicated servo surface. The drive system provides data storage of between about 21 and 50 Megabytes, once the disks are formatted.

14 Claims, 4 Drawing Sheets

ROTARY VOICE COIL MICRO-HARD DISK DRIVE SYSTEM

This is a continuation of co-pending application Ser. No. 854,949, filed on Apr. 23, 1986, now abandoned.

BACKGROUND OF THE INVENTION

The present invention relates to a hard disk drive system, in particular a micro-Winchester disk drive system.

With the rapidly expanding development of personal computers and desk top data processing systems, there has been a demand for increasing the performance of the disk drive systems of such computers. The major development in this direction has been the introduction of small Winchester disk drives as replacements and enhancements to floppy disk drives for program storage. The Winchester disk drive in general provides higher capacities and faster speeds of operation, factors which are important for the effective use of personal computers running advanced software packages.

The types of Winchester disk drives that have developed in this regard were originally based on the use of hard disks of diameter of approximately 5¼ inch, also known as mini-Winchester disks, and this so called "5¼ inch" disk drive has generally developed as an "industry standard." Such a Winchester disk drive can store typically 5–30 Megabytes of information when designed around an open-loop positioning system using a stepper motor capable of supporting up to approximately 360 data tracks per inch. However, advances made by the assignee of the present invention have expanded the storage capacity of the typical 5¼ inch disk drive up to 600 tracks per inch using this same basic type of open-loop positioning system, a track density previously believed not to be obtainable with such a stepper motor technology. Likewise, the assignee of the present invention has developed a 3½ inch Winchester disk drive having 600 tracks per inch.

More recently, however, closed-loop positioning systems have been developed for use with 5¼ Winchester disk drives. Such drives typically use a linear voice coil motor to provide motive force for the actuator for positioning the heads over the appropriate tracks. Such closed-loop positioning systems are capable of achieving much higher numbers of data tracks per inch. For example, one such disk drive developed by the assignee of the present invention supports approximately 925 tracks per inch, with a resulting formatted storage capacity using a standard ST506/412 interface of approximately 5.3 Megabytes per disk surface. The positioning scheme of that disk drive is disclosed In the U.S. Pat. No. 4,638,384, issued Jan. 20, 1987.

With the introduction and popularity of portable personal computers, it is clearly a performance advantage if they can achieve a high degree of software compatibility with the desk top computing systems. Portability demands special requirements on the incorporation of a hard disk system, for example, light-weight, low power consumption and also the capability of withstanding harsher shock and vibration conditions. However, software compatibility also demands performance parameters such as data storage capability comparable to those available on 5¼ inch mini-Winchester disk drive systems.

As the software run on personal computers becomes more and more powerful and requires ever increasing amounts of media memory space, greater demand has been created for a micro-Winchester disk drive system having a large amount of data storage. Such disk drives are capable of storing such programs as well as providing fast access to the program and accompanying data for use by the central processing unit of the host microcomputer. At the same time, only a limited amount of physical space within the personal computer itself is required. A micro-Winchester disk drive typically measures 5.75"×4.00"×1.625" (l×w×h). The larger the storage capacity and the smaller the access time of the disk drive, the more complex and more powerful the software that can be run on that drive and the faster that program and its data can be accessed by the host computer.

SUMMARY OF THE INVENTION

It is an object of the present invention to provide a compact micro-hard disk drive system having a high performance capability.

Another object of the present invention is to provide an improved hard disk drive system in which the size, weight, sensitivity to vibrations, power consumption and heat dissipation are minimized without sacrificing high performance capabilities, thereby rendering the system particularly advantageous for use in portable computing systems.

Still another object of the present invention is to provide a micro-Winchester disk drive with a closed-loop positioning system capable of providing performance parameters comparable to those of 5¼ inch Winchester disk drives and greater than those of existing 3½" Winchester disk drives.

A further object of the present invention is to provide a micro-Winchester disk drive system that affords storage capacity of at least approximately 9 megabytes per disk surface in its unformatted configuration and at least approximately 7 megabytes per disk surface in its formatted configuration.

A still further object of the present invention is to provide a micro-Winchester disk drive system that is electrically compatible with 5¼ inch disk drives in its interface to host computer systems.

A still further object of the present invention is to provide a micro-hard disk drive system in which the disk housing assembly is formed of two clamshell-shaped housing portions and in which the spindles which carry the positioning mechanism and the spindle motor are fixed thereto.

It is still a further object of the present invention to provide a micro-Winchester disk drive system having a maximum of four disks and an in-hub spindle motor in which a rotary voice coil positioning mechanism is utilized to achieve a high track density.

Another object of the present invention is to provide a micro-Winchester disk drive system in which data is stored at a density of approximately 1040 tracks per inch.

The micro-Winchester disk drive system of the present invention was developed to provide a disk drive system particularly suited to meet the high storage demands of personal computer systems. The terminology, micro-Winchester disk, refers to a Winchester disk of 85–100 mm in diameter, with the preferred embodiment being approximately 95 mm. A Winchester disk of this size is also referred to as a "3½ inch" Winchester disk. The micro-Winchester disk drive system was developed to incorporate the 1040 tracks per inch closed-loop positioning capability. This new disk drive system, by virtue of its small size, high storage capacity, high positioner accuracy and vibration isolation, is ideally suited for use in personal computer systems, both desk top and portable.

The disk drive system of the present invention is constructed for operating micro-Winchester computer disks. This disk drive system provides fast access data storage for use with small business computers, terminals and microprocessor-based systems, portable or otherwise, and in many other areas where compact, rugged and lightweight hard disk storage is required. The disk drive system of the present invention normally utilizes either two, three or four hard disks such as Winchester disks and provides data storage on each disk (except the servo disk) in excess of 14 megabytes, once the disks are formatted. The system is capable of storing in excess of 9 Megabytes per disk surface utilized with the disk unformatted.

Each of the hard disks is mounted for rotation within the housing of the hard disk drive system of the present invention. In accordance with the preferred embodiment, each of those hard disks is 95 mm in diameter. A transducer, which includes two read/write heads for each disk within the system, one head positioned on each side of the disk, writes digital information on and reads digital information from the hard disk. However, since the present disk drive system utilizes one disk surface for dedicated servo storage, it should be understood that the transducer associated with that disk surface, after the initial writing of the servo data during disk drive manufacture, is used only to read such servo data. The disk drive system of the present invention operates so that such information is stored on the disk at a density of approximately 1040 concentric tracks per inch. A positioning mechanism moves the transducer between the tracks on the computer disk for writing information on the disk and reading information from the disk.

The positioning mechanism of the disk drive system of the present invention is arranged for moving the transducer along a path extending in an approximately radial direction with respect to the hard disk so that the transducer can move between the innermost and outermost tracks on the disk. The positioning mechanism moves the transducer along an arcuate path that extends in the radial direction with respect to the disk.

The positioning mechanism of the disk drive system of the present invention also includes a voice coil motor and a rotary positioning mechanism connected thereto. In the operation of such rotary voice coil actuator, a control signal is generated in a known manner, which causes such actuator to move the plurality of ganged heads from one track to the desired next track.

One of the disk surfaces, for example, in the preferred embodiment, the top surface of the top disk, is dedicated to storing servo signals for use with the closed-loop positioning system utilized by the disk drive system of the present invention. The head associated with such dedicated servo is normally enabled only to perform a read function, so as not to write over or erase the prerecorded servo signals. A description of the servo signals and their use in operating the disk drive of the present invention is contained in concurrently filed U.S. patent application Ser. No. 854,825, entitled "Servo Positioning System For Disk Drive System, now U.S. Pat. No. 4,682,253 and" commonly assigned herewith. The disclosure of that application is incorporated herein.

Each of the plurality of read/write heads of the transducer is arranged on one end of a flexure, which extends in a radial direction with respect to the disks. The other end of each flexure is arranged on one end of one of a plurality of fingers of a support arm. The support arm, which includes the plurality of fingers, is pivotably attached to a spindle which is fixed to both of the clamshell-shaped pieces of the disk drive case. That arm spindle is located on one side of the support arm and is spaced away from the end of the arm which contains the fingers, flexures and heads. The support arm is designed to extend in a radial direction toward the disks. Likewise, the flexures are attached to the support arm in a similar manner such that, when the support arm is in its fully counter-clockwise position, the heads are positioned over their respective disks.

The rear portion of the support arm opposite the point of attachment of the flexures has attached thereto a rectangular coil which fits into the rotary voice coil assembly to provide a means of causing the support arm to pivot around its spindle so as to control the position of the heads. That pivoting of the support arm causes the heads to move back and forth over tracks of the disks. A solenoid operated lock is also provided for securing the positioning mechanism in its fully-clockwise position, with the heads at the extreme inside of the disks when the drive is powered-off. Thus, damage to the disk surfaces from head bounce or other causes when the drive is not in operation is prevented.

The disk drive system of the present invention is contained in a housing in which the micro-hard disks, the transducers and the entire positioning mechanism are contained. That housing is constructed of two clamshell-shaped pieces, one top and one bottom piece. An air filtration system is utilized to maintain the "clean" nature of the Winchester hard-disk assembly (HDA). Shock and vibration reduction supports are also provided so as to minimize the transmission of shock and vibration from the host personal computer to the housing.

Each of the from two to four hard disks is rigidly mounted to the hub of a spindle drive motor. Ferrofluidic and labyrinth seals are fitted to the respective drive motor bearings in order to prevent contamination of the HDA. The entire spindle drive motor is contained within the HDA and is rigidly mounted to both clamshell-shaped housing pieces which contain the drive. The motor spindle, by means of bearings which allow the hub to rotate around the spindle, is fixedly mounted to the drive housing, thus still allowing the motor to rotate. Such a mounting structure, as well as the provision of mounting the rotary voice coil actuator to an actuator spindle fixedly secured at both sides of the clamshell-shaped housing members, provides an increased rigidity which enables the use of two clamshell-shaped sections for incorporating the HDA. In addition, the use of two clamshell-shaped sections for the housing provides for an ease of assembly and servicing heretofore unknown in the disk drive industry.

The electronics of the micro-Winchester disk drive system of the present invention have been developed utilizing integrated circuits. The entire control circuit is arranged on a single printed circuit board. Providing electronic functions of the drive on a single printed circuit board whose dimensions do not exceed the overall dimensions of the drive permits the drive to be used in applications which in the past were limited to only the much larger mini or 5¼ Winchester disk drive systems. Further, the electronic functions have been implemented using intergrated circuit chips of different types using surface mounting technology, on a six layer circuit board, with the objective of functioning with a minimum use of power.

DESCRIPTION OF THE PREFERRED EMBODIMENT

Figure 1:
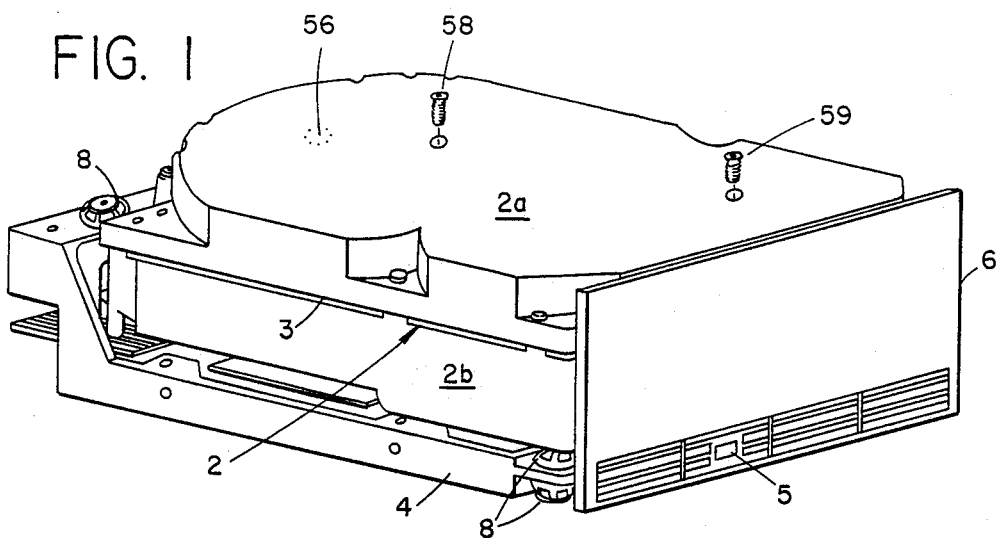
FIG. 1 is a side perspective view of the housing of the disk drive system of the present invention mounted within its frame assembly.

A micro-Winchester disk drive system in accordance with the present invention is shown in FIG. 1. The disk drive system includes a housing 2 comprised of top and bottom clamshell-shaped pieces 2a and 2b, which is mounted in turn within a frame 4. Frame 4 is attached to a face plate, or facia, 6. Face plate 6, with housing 2 and frame 4, may be slid into a slot provided within the host computer for the disk drive system. In order to secure the housing 2 and hence the internal operating members of the disk drive system against vibrational forces, a plurality of anti-vibration mounts 8 are provided. As, shown, the disk drive system of FIG. 1 may readily be mounted in a standard 3½ Winchester disk drive mounting space.

Figure 2:
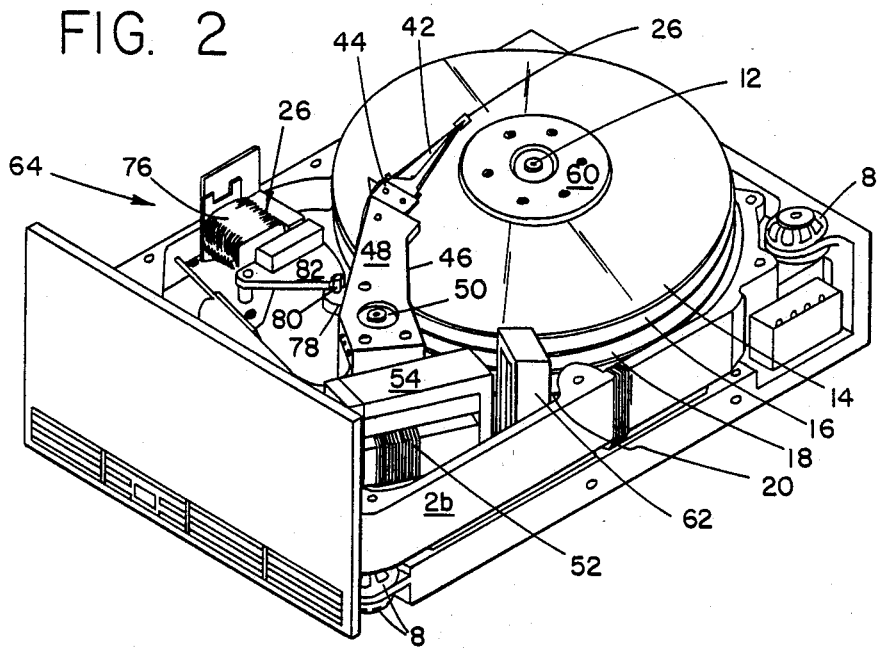
FIG. 2 is a top perspective view of the disk drive system of the present invention with the top housing piece removed to disclose the contents of the drive.

It is also possible to mount the micro-Winchester disk drive system of the present invention within a larger opening constructed for receiving a 5¼ inch disk drive system. In such an arrangement, as shown in FIG. 2 of commonly assigned U.S. Pat. No. 4,568,988, entitled "Micro-Hard Disk Drive System," the housing 2 with frame 4 is placed inside of a second frame. The second frame is attached to a larger face plate and to the first frame 4. With such an arrangement, a second series of anti-vibration mounts can be provided between first and second frames for further isolating the disk drive system against shock and vibrational forces in directions both parallel and orthogonal to the direction of isolation provided by the first set of anti-vibration mounts.

The disk drive system in accordance with the preferred embodiment of the present invention is a microprocessor-based device which receives and transmits MFM (modified frequency modulation) data, seeking the appropriate track in response to step pulses across the disk control interface. There are three embodiments, containing 2 thru 4 hard disks and respectively ranging in total data storage capacity from 27.26 to 63.59 Megabytes. A typical format scheme with 256 data bytes per sector and 32 sectors per track can realize an efficiency of about 79% giving formatted capacities up to about 50 Megabytes.

The microprocessor is responsible for the control of the voice coil motor used for head positioning. Fast seek times are achieved by the use of programmed velocity profiles. A three-phase brushless D.C. motor rotating at 3600 r.p.m. is used for driving the disks at a constant speed. Hall effect devices are used for commutation of the motor windings and for motor speed control. The motor may preferably be of a fixed spindle, rotating hub variety. Ferrofluidic and labryinth seals are fitted to the drive motor bearings in order to prevent contamination of the HDA.

A summary of the important performance parameters is given below:

| GENERAL PERFORMANCE | |
| --- | --- |
| Disks per drive | 2,3,4 |
| Heads | 4,6,8 |
| Unformatted capacity (Megabytes) | 27.26, 46.21, 63.59 |
| Formatted capacity (typical) | |
| Per drive (Megabytes) | 21.43, 35.71, 50.00 |
| Per track (bytes) | 8192 |
| Per sector (bytes) | 256 |
| Sectors per track | 32 |
| Cylinders | 672 |
| Transfer rate (M bits/s) | 5 |
| Seek times (ms) (including settling) | |
| Track to track | 7 |
| Average | 30 |
| Maximum | 60 |
| Average latency (ms) | 8.3 |
| Bit density (max) | 15,072 bits per inch |
| Track density (max) | 1040 tracks per inch |
| Rotational speed (r.p.m.) | 3600 + 10%, −5% |

| SHOCK & VIBRATION | | |
| --- | --- | --- |
| SHOCK | | |
| Operating | 10 g | 10 ms duration peak acceleration |
| Non-Operating | 50 g | |
| VIBRATION | | |
| Operating | 5 Hz to 500 Hz | 1.0 g acceleration |
| Non-operating | 5 Hz to 500 Hz | 2.0 g acceleration |

A top perspective view of the disk drive system of the present invention is shown in FIG. 2. As shown therein, four micro-Winchester disks, 14, 16, 18 and 20, are arranged on the hub 22 of a D.C. motor 24 for rotation within the housing 2. Magnetic heads 26, 28, 30, 32, 34, 36, 38 and 40 are attached to flexures 42 which are attached to fingers 44 which are formed as a part of the support arm 46. That support arm forms part of the positioning mechanism 48 which is rotated about a fixed arm spindle 50 by means of a rectangular coil 52 attached thereto. The coil 52 is mounted in such a manner that it is driven by voice coil motor 54.

A breather filter 56 is provided on the top half of the disk housing adjacent to the center of the top hub plate 60 of the D.C. spindle motor 24. A recirculating filter 62 is located inside the HDA chamber 64 in a suitable position to filter the flow of air resulting from the pumping effect of the rotating disks when the disk drive is in operation. The top casing 2a seals the enclosure by means of a continuous gasket 3 positioned between itself and the bottom casing 2b. An electronics board 66 is fixed to the bottom casing and covers the full area of this face of the disk drive. The D.C. motor 24 has its center spindle 12 fixed to the bottom half 2b of the disk drive unit by means of a press fit. The top of the spindle 12 is fixedly mounted to the upper casing half 2a by suitable means such as a screw 58.

Figure 3:
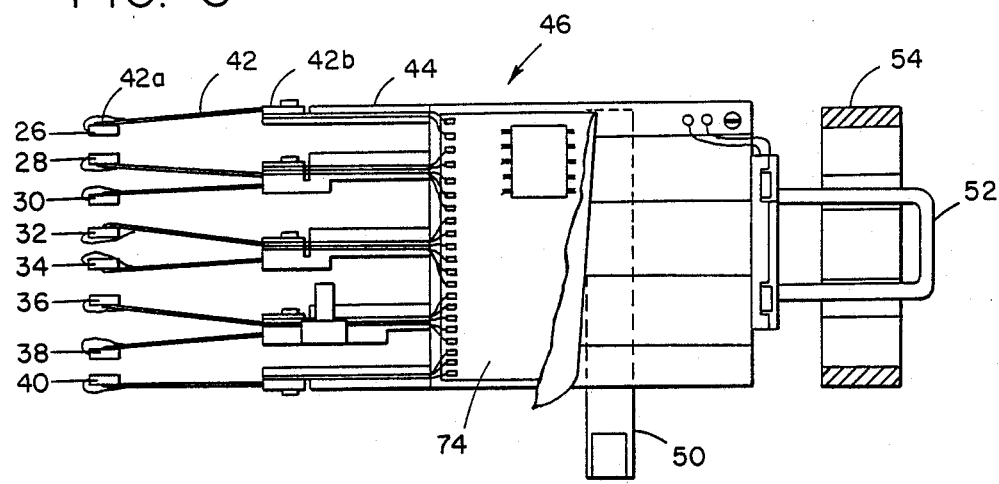
FIG. 3 is a side view of the rotary voice coil positioning mechanism of the disk drive system of the present invention.
Figure 4:
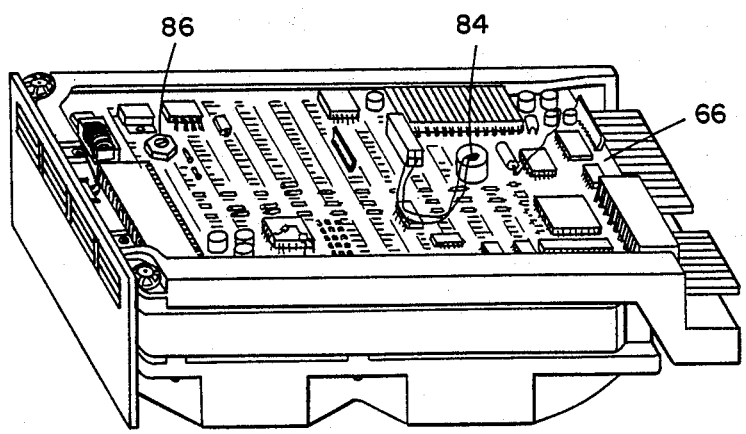
FIG. 4 is a bottom view of the disk drive system of the present invention.

The positioning mechanism 48 is shown in greater detail in FIG. 3. That positioning mechanism 48 is mounted on the base of the lower housing 2b within chamber 64 of the disk drive system. Chamber 64 is formed by the lower housing 2b and upper housing 2a. A plurality of Winchester disks are mounted on the hub assembly 22 of the D.C. spindle motor 24 within chamber 64 so that they are rotated within the chamber by the D.C. motor. The arm spindle 50, about which the support arm 46 rotates, is fixedly connected to the upper housing 2a by a screw 59 and to the lower housing by a nut 86.

The typical read/write magnetic head 26 is mounted on one end 42a of a flexure 42, which serves to support it over the disk surface. The other end 42b of flexure 42 is attached to a finger 44 of a support arm 46. The flexure 42 is a thin rectangular stainless steel foil. The positioning arm 46 is rotatably mounted to the steel spindle shaft 50 by means of grub screws (not shown) and rides on suitable bearings (not shown) thereon. The support arm 46 is angled towards the disk such that, together with an additional angle provided by the fingers 44 of the support arm 46, the heads are placed in their proper position. Such construction ensures that the heads are always over the disk surfaces, even at both extreme positions of travel of the positioning mechanism 48.

A rectangularly-shaped rotary voice coil motor 54 is mounted to the lower casing 2b of the disk drive system adjacent to the end of the positioning arm 46 opposite the magnetic heads. The rectangular coil 52 attached to that end of the arm 46 is arranged to cut the magnetic force field created by the voice coil motor 54 such that it causes the positioning mechanism 48 to rotate about the fixed spindle shaft 50. The support arm assembly 46 is statically balanced about the actuator spindle 50. Positioning is accomplished by means of a closed-loop servo control system which uses information derived from a dedicated servo surface recorded on, in the preferred embodiment, the top surface of the upper-most disk.

An electrical interface between the heads and the electronics board is provided by means of a flat flexi-circuit 74 which incorporates separate pre-amplifier circuits for the servo head and the data heads. The electronics circuit board contains all circuitry necessary to implement read/write and head selection, motor speed control, closed-loop positioner controller, host controller interface (ST 506/412) and microprocessor.

The microprocessor, which is provided with 4k bytes of memory storage, for example, by means of a ROM, provides a full automatic power-up sequence with diagnostics; motor speed control check to ±1% during power up and regular motor speed control checks to +10%, -5% after power-up; control of the output lines from the disk drive system and latching upon detected fault conditions; voice-coil positioner control, including mode select and velocity ramp generation and fault code indication by means of codes in a front panel LED 5. An index pulse is derived from information recorded on the dedicated servo surface once per revolution.

The D.C. motor 24 which drives the disks is of the rotating hub, fixed shaft type and is of a brushless 3-phase design. The hub 22 and electromagnets rotate around the fixed shaft 12, riding upon a pair of bearings, one near the top and the other near the bottom of the shaft. A ferrofludic seal is provided on the outside of the bottom bearing and a labyrinth seal is provided on the outside of the upper bearing. A series of three Hall sensors are contained on a flexi-circuit mounted on the bottom casing 2b for commutation purposes. The bottom of the shaft 12 is fixedly attached to the bottom casing 2b of the drive, by a press fit in socket 84 in the preferred embodiment. The upper end of the shaft contains inner threads to which a screw 58 is secured, through the upper casing 2a.

A solenoid-operated lock 25 is provided adjacent to the support arm portion 46 of the positioning mechanism 48. A pin support 78 is formed on the opposite side of the support arm 46 away from the disks, which has a pin 80 affixed thereto. A generally triangularly-shaped locking member 82 is pivotably attached to the solenoid locking assembly 76. It is also attached to the moving shaft of the solenoid, but is spring-loaded such that when power is applied to the solenoid, the solenoid shaft must work against the spring tension to remove the locking member from its locked position to its unlocked position. In its locked position, the heads are held at the inner radius of the disks, in order to prevent damage to the HDA.

In developing the electronics for the micro-Winchester disk drive system of the present invention, the electronic circuits were designed primarily as integrated circuits that are placed on a single printed circuit board 66. The use of only a single printed circuit board whose dimensions lie within the outline dimensions of the housing 2, is particularly beneficial in enabling the drive to be used in personal computers in which space is at a premium, for example, in portable computers, as well as providing an anti-vibration mounting arrangement to be utilized for mounting the micro-Winchester disk drive system. Consequently, an extremely rugged, low weight, hard disk drive system is provided for use in a portable computer.

The development of the single printed circuit board electronic control circuit in the present micro-Winchester disk drive system has enabled the power consumption and dissipation to be significantly reduced. For example, the electronic circuitry in the preferred embodiment provides heat dissipation at a rate of about 12 watts as compared to 25 watts typically dissipated by 5¼ inch Winchester disk drive systems. Thus, the micro-Winchester disk drive system of the present invention dissipates a relatively small amount of heat in the computer system. That enables a portable computer either to utilize a smaller fan or to eliminate the use of a fan for removing heat from the system.

Figure 5:
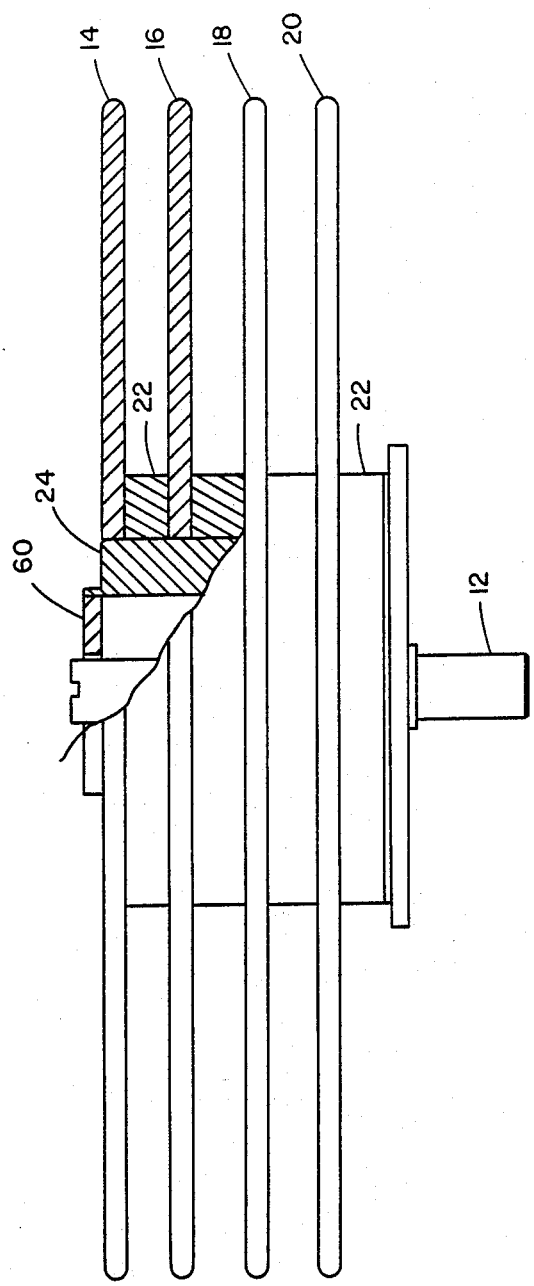
FIG. 5 is a side view of the fixed spindle rotating hub drive motor, with disks attached, used in the disk drive system of the present invention.
Figure 6:
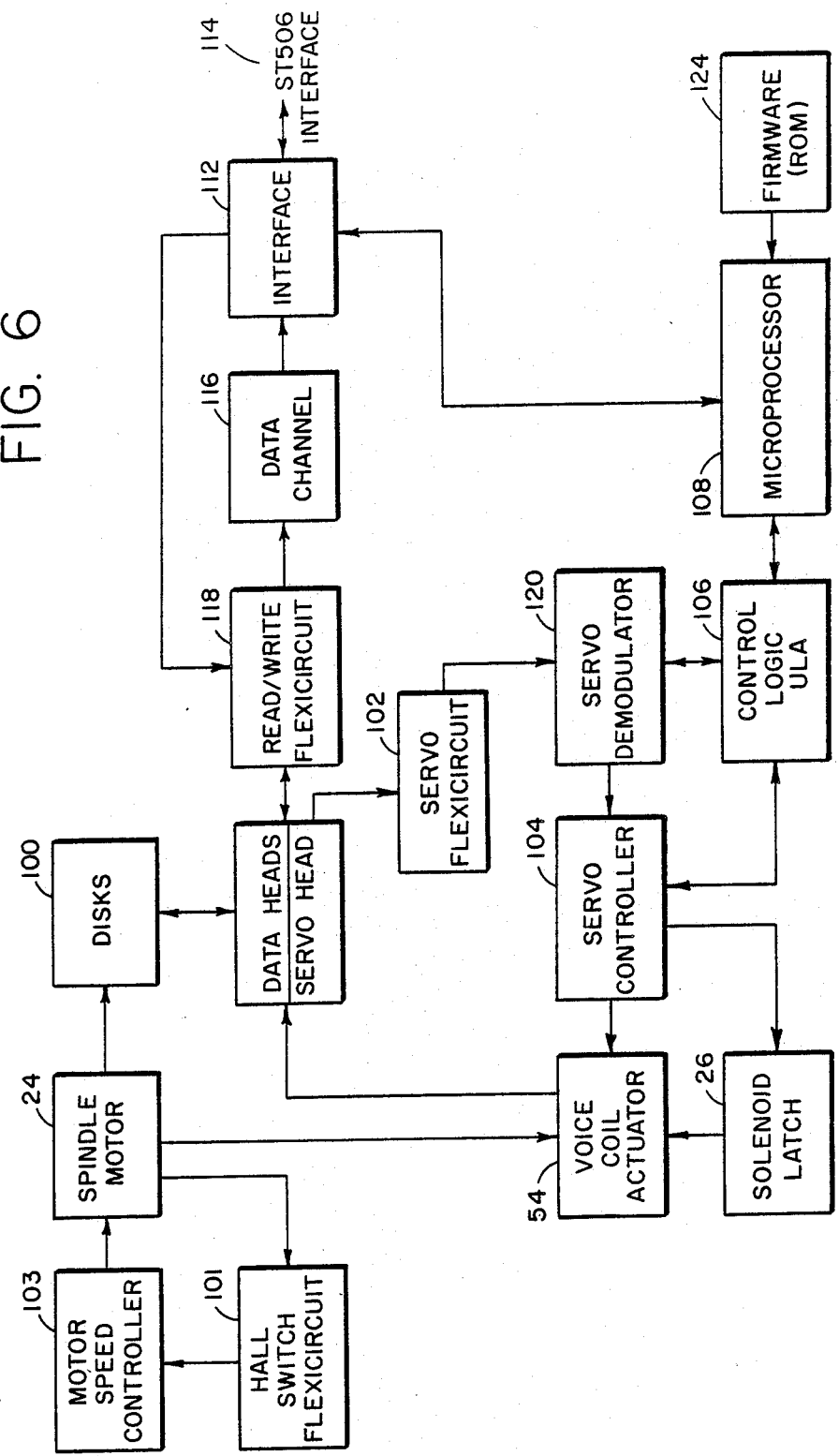
FIG. 6 is a functional block diagram of the control circuit for use with the disk drive system of the present invention.

A functional block diagram illustrating the functional operation of the disk drive of the present invention is shown in FIG. 5. The spindle motor 24 is provided with a source of 12 v D.C. power which causes the disk assembly attached to its hub 22 to rotate at 3600 r.p.m.. The three Hall sensors used for commutation purposes are contained on a flexi-circuit 101 mounted to the bottom casing, as described previously. Those Hall sensors provide signals indicative of the motor speed and position to a motor speed controller 103 which applies the proper phases of signal at the proper rate to cause the motor to rotate at the desired speed.

As the drive is powered-up, the solenoid shipping latch is actuated and unlatches the positioner mechanism. The servo head reads the pre-recorded servo signals from the dedicated servo disk and transmits them through a preamplifier on servo flexi circuit 102 and servo demodulator 120 to the servo controller 104 and, through the control logic ULA 106, to the microprocessor 108. The microprocessor provides the functions described previously, by means of firmware stored, for example, in a ROM 124. The firmware 124 contains a look-up table which generates the velocity profiles used during such operations, as well as routines for the power-up sequences and fault monitoring. The microprocessor also communicates with the drive interface 112 which is itself in communication with the host computer (not shown) through, for example, a standard ST 506/412 interface 114.

That host interface 114 provides and receives data and control signals. The data signals pass through a data channel 116. The read data is pre-amplified in the circuity contained in the read/write flexi-circuit 118, which provides its output to the data channel 116. The data to be written on the disks is transmitted through the drive interface 112 directly to the read/write flexi-circuit 118 where it is written on the selected one of disks 100 by means of the appropriate enabled data head.

The position of the heads on the disks is controlled by means of the microprocessor 108, through the control logic ULA 106 and the servo controller 104 connected to that control logic.

The microprocessor 108 buffers step pulses from the drive interface 112 to the voice coil motor 54. There are two seek modes, ramped and unramped. The interface step rate determines the seek mode automatically. In the ramped mode of operation, the microprocessor accelerates the voice coil motor such that an average access time of 30 ms is achieved The average access time is defined as the total time for all possible cylinder accesses divided by the number of all possible cylinder accesses. When the drive is powered-off, the spindle motor back e.m.f. is used to move the actuator such that the positioning mechanism is driven to its position at the innermost part of the disks.

Although only a preferred embodiment is specifically illustrated and described herein, it will be appreciated that many modifications and variations of the present invention are possible in light of the above teachings and within the purvue of the appended claims without departing from the spirit and intended scope of the invention.

What is claimed is:

1. A computer disk drive system for operating a micro-hard disk, said drive system being contained within a 3½ inch Winchester drive form factor, comprising:
   at least three micro-hard disks each having a plurality of tracks;
   means including a motor for rotating and rotatably supporting said at least three micro-hard disks;
   transducer means for writing digital information on and reading digital information from said at least three micro-hard disks;
   rotary voice coil positioning means for moving said transducer means between said tracks on said at least three hard disks to provide and average seek time of approximately 30 millisecond or less;
   two clamshell-shaped upper and lower housing members forming a housing in which said transducer means, said rotary voice coil positioning means and said motor are contained; and
   an inner portion of said motor, about which a rotatable portion of said motor rotates, is fixedly secured to both of said upper and lower housing members so that said inner portion does not move relative to both of said upper and lower housing members.

2. The disk drive system of claim 1, wherein said disk drive system provides an unformatted storage capacity in excess of 35 Megabytes.

3. The disk drive system of claim 1, wherein said said drive system provides an unformatted storage capacity in excess of 63 Megabytes.

4. The disk drive system of claim 1, wherein said means for rotating includes a three-phase brushless D.C. motor having a plurality of sensing means for providing commutation means therefor.

5. The disk drive system of claim 1, further including a single printed circuit board which contains electronic circuitry for operating the disk drive.

6. The disk drive system of claim 1, further comprising a positioning arm spindle, about which said rotary voice coil positioning means rotates, said spindle being fixedly secured to both of said upper and lower housing members so that said spindle does not move relative to both of said upper and lower housing members.

7. The disk drive system of claim 1, wherein said digital information is stored at a density of at least 800 concentric tracks per inch.

8. The disk drive system of claim 1, wherein said disk drive system provides an unformatted storage capacity in excess of 27 Megabytes.

9. The disk drive system of claim 1, wherein a portion of said rotary voice coil positioning means is pivotably mounted for moving said transducer means along a path extending in an approximately radial direction with respect to said at least three hard disks so that said transducer means can move between the innermost and outermost tracks on said at least three hard disks.

10. The disk drive system of claim 1, further comprising a second transducer means for reading servo information recorded on one surface of one of said at least three micro-hard disks, said one surface acting as a dedicated servo surface.

11. The disk drive system of claim 10, wherein said second transducer is enabled to perform only a read function.

12. The disk drive system of claim 1, wherein said 3½ inch Winchester drive form factor measures approximately 5.75" by 4.00" by 1.625'.

13. The disk drive system of claim 1, wherein said tracks on said at least three hard disks are arranged at a density of at least approximately 1040 tracks per inch.

14. A computer disk drive system for operating a micro-hard disk, said drive system being contained within a 3½ inch Winchester drive form factor, comprising:
   at least three micro-hard disks each having a plurality of tracks;
   means including a motor for rotating and rotatably supporting said at least three micro-hard disks;
   transducer means for writing digital information on and reading digital information from said at least three micro-hard disks;
   rotary voice coil positioning means for moving said transducer means between the tracks on said at least three hard disks to provide an average seek time of approximately 30 milliseconds or less;
   two clamshell-shaped upper and lower members forming a housing in which said transducer means, said rotary voice coil positioning means and said motor are contained; and
   a positioning arm spindle, about which said rotary voice coil positioning means rotates, said spindle being fixedly secured to both of said upper and lower housing members so that said spindle does not move relative to both of said upper and lower housing members.

* * * * *